United States Patent

[11] 3,616,377

| [72] | Inventors | Donald R. Arnold<br>Lincolndale, N.Y.;<br>Anthony A. Sousa, Raleigh, N.C. |
|---|---|---|
| [21] | Appl. No. | 836,639 |
| [22] | Filed | June 25, 1969 |
| [23] | | Division of Ser. No. 536,662, Mar. 23, 1966, Pat. No. 3,418,330, which is a continuation-in-part of Ser. No. 324,183, Nov. 18, 1963, abandoned. |
| [45] | Patented | Oct. 26, 1971 |
| [73] | Assignee | Union Carbide Corporation<br>New York, N.Y. |

[54] PROCESS FOR THE PREPARATION OF OXETANES AND DERIVATIVES THEREOF BY PHOTOCYCLO ADDITION
5 Claims, No Drawings

[52] U.S. Cl. .................................................. 204/162 R,
204/158 R, 204/163 R
[51] Int. Cl. ............................................................ B01j 1/10
[50] Field of Search ............................................ 204/162, 158, 163

[56] References Cited
OTHER REFERENCES

Organic Photochemistry, Edited by Orville L. Chapman, Marcel Dekker, Inc., New York, 1967, Vol. I, pages 237–246 (QD601.A107)

*Primary Examiner*—Benjamin R. Padgett
*Attorneys*—Paul A. Rose, Gerald R. O'Brien, Jr., Harrie M. Humphreys and William R. Moran ABSTRACT: Oxetanes, such as the 3-oxatricyclo [4.2.1.0] nonanes, are prepared by the photocatalyzed reaction of a ketone with an olefinic compound. The reaction is carried out by bringing the ketone and the olefinic compound into admixture in a suitable reactor and irradiating the mixture with light energy.

PROCESS FOR THE PREPARATION OF OXETANES AND DERIVATIVES THEREOF BY PHOTOCYCLO ADDITION

This application is a divisional of U.S. application Ser. No. 536,662 entitled "3-Oxatricyclo[4.2.1.0$^{2,5}$]nonanes And Use Thereof" filed Mar. 23, 1966 by D. R. Arnold and A. A. Sousa now U.S. Pat. No. 3,418,330. Ser. No. 536,662 is a continuation-in-part of U.S. Pat. application Ser. No. 324,183, now abandoned, entitled "Novel Oxetanes And Use Thereof" filed Nov. 18, 1963 by D. R. Arnold and A. A. Sousa.

The present invention is directed to novel heterocyclic organic compounds and to a process for their preparation. In one aspect, this invention is directed to novel oxetanes. In a further aspect, this invention relates to certain novel oxetanes which are useful in fungicidal applications, particularly, as mildewcides.

Heretofore, a wide variety of synthetic methods have been reported in the literature for the preparation of oxetanes. However, most of these methods are not very general and frequently require starting materials which are exceedingly difficult to prepare. Moreover, the reported synthetic methods rarely give high yields and hence are undesirable for large-scale commercial production.

It has recently been discovered that a wide variety of novel oxetanes can be conveniently prepared by the photocyloaddition of carbonyl compounds to olefins. In many instances, the yields of the desired octanes are high, sometimes nearly quantitative. Moreover, the starting materials are readily available and hence oxetanes can readily be obtained which were difficult or impossible to prepare by classical methods.

Accordingly, one or more of the following objects will be achieved by the practice of the instant invention. It is an object of this invention to provide a class of novel oxetanes. Another object of this invention is to provide a class of novel oxethanes which are characterized by the presence or a norbonyl moiety in the molecule. A further object is to provide novel 4-pyridyl-4-phenyl-3-oxatricyclo[4.2.1.0$^{2,5}$]nonanes. Another object is to provide certain novel oxetanes which are useful in agricultural and biological applications. A still further object of this invention is to provide certain novel oxetanes which are useful as mildewcides. Another object is to provide a process for the preparation of novel oxetanes. These and other objects will readily become apparent to those skilled in the art in the light of the teachings herein set forth.

The novel oxetanes of this invention can be represented by the structural formula:

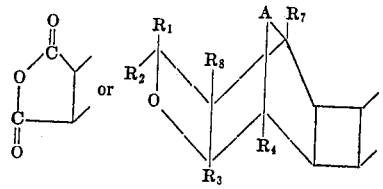

wherein A represents an oxy group or an alkylene group, i.e., methylene or substituted methylene groups; $R_1$ and $R_2$ individually represent hydrocarbyl, halohydrocarbyl, aminohydrocarbyl, alkoxyhydrocarbyl, aminoalkoxyhydrocarbyl, or heterocyclyl groups; and $R_3$–$R_8$ represent hydrogen, halogen, hydrocarbyl, halohydrocarbyl, alkoxyhydocarbyl, hydroxyhydrocarbyl, alkoxycarbonylhydrocarbyl, and carboxy groups, with the provisos that: (1) $R_1$ and $R_2$ can together with the carbon atom to which they are attached represent the group

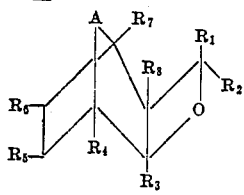

wherein $R_3$ is as above, and B represents a sulfonyl group, i.e.

a lower alkylene group of from one to two carbon atoms, or an alkyl-substituted lower alkylene group of from two to 10 carbon atoms, (2) $R_5$ and $R_6$ can together with the carbon atoms to which they are attached represent

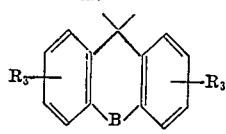

wherein $R_1$–$R_4$ and $R_7$ and $R_8$ are as above, and (3) when A is methylene, $R_1$ and $R_2$ are not both hydrocarbylaryl.

Preferred novel oxetanes encompassed by the aforementioned formula are those wherein A is methylene, $R_1$ and $R_2$ individually represent alkyl, alkenyl, aryl, alkaryl, aralkyl, cycloalkyl, bicycloalkyl, haloalkyl, haloaryl, haloalkaryl, halocarbonyl, alkoxyaryl, aminoalkyl, aminoaryl, alkylaminoalkyl, dialkylaminoalkyl, dialkylaminoalkoxyalkyl, pyridyl (ortho, meta and para), alkylpyridyl, piperidyl, piperidylalkyl, alkylpiperidyl, piperidinoalkyl, pyrimidyl, alkylpyrimidyl, pyrimidinylalkyl, pyrazolyl, pyrazyl, pyrazylalkyl, N-alkoxycarbonylpiperazinylalkyl, piperizinyl, N-alkylpiperazinylalkyl, morpholinyl, alkylmorpholinyl, 1,2,5,6-tetrahydropyridyl, N-alkyl-1,2,5,6-tetrahydropyridyl, N-aryl-1,2,5,6-tetrahydropyridyl, N-aralkyl-1,2,5,6-tetrahydropyridyl, carbamyl, alkylcarbamyl, cycloalkylcarbamyl, N-heterocyclcarbamyl and the like; and $R_3$–$R_8$ represent hydrogen, halogen, e.g., chloro, bromo, fluoro, iodo, alkyl, alkenyl, aryl, alkaryl, aralkyl, cycloalkyl, cycloalkenyl, bicycloalkyl, bicycloalkenyl, haloalkyl, haloaryl, haloalkaryl, halocycloalkyl, alkoxyalkyl, alkoxyaryl, aminoalkyl, aminoaryl, alkylaminoalkyl, dialkylaminoalkyl, dialkylaminoalkoxyalkyl and the like.

Particularly preferred oxetanes are those wherein the R variable contains up to 18 carbon atoms and wherein at least one of the $R_1$ and $R_2$ variables is a heterocyclic group composed of carbon, hydrogen, and from one- to two-ring nitrogen and/or oxygen atoms.

Illustrative novel oxetanes encompassed by the aforementioned formula include, among others, the 4,4-dihydrocarbyl-3oxatricyclo[4.2.1.0$^{2,5}$]nonanes, e.g., 4,4-dipropyl-3-oxatricyclo[4.2.1.0$^{2,5}$]nonane, and the like; the halogenated 4,4-dihydrocarbyl-3-oxatricyclo[4.2.1.0$^{2,5}$]nonanes, e.g., 4-chloromethyl-4-phenyl-3-oxatricyclo[4.2.1.0$^{2,5}$]nonane, 4,4-di(parachlorophenyl-3-oxatricyclo[4.2.1.0$^{2,5}$]nonane, and the like; the 4-hydrocarbyl-4-heterocyclyl-3-oxatricyclo[4.2.1.0$^{2,5}$]nonanes, e.g., 4-(orthopyridyl)-4-phenyl-3-oxatricyclo[4.2.1.0$^{2,5}$]nonane, 4-(metapyridyl)-4-phenyl-3-oxatricyclo[4.2.1.0$^{2,5}$]nonane, 4-(parapyridyl)-4-phenyl-3-oxatricyclo[4.2.1.0$^{2,5}$]nonane, 4-methyl-4-(parapyridyl)-3-oxatricyclo[4.2.1.0$^{2,5}$]nonane, 4-(metapyridyl)-4-biphenylyl-3-oxatricyclo[4.2.1.0]nonane, and the like; the 4,4-diheterocyclyl-3-oxatricyclo[4.2.1.0$^{2,5}$]nonanes, e.g., 4,4-di(metapyridyl)-3-oxatricyclo[4.2.1.0$^{2,5}$]nonane, and the like; the halogenated 4-hydrocarbyl-4-heterocyclyl-3-oxatricyclo[4.2.1.0$^{2,5}$]nonanes, e.g., 4-(parachlorophenyl)-4-(parapyridyl)-3-oxatricyclo[4.2.1.0$^{2,5}$]nonane, and the like; the 4-hydrocarbyl-4-pyridyl-3-oxatricyclo[4.2.1.0$^{2,5}$]nonanes having substituents on one or more of the carbon atoms of the norbornane moiety, e.g., 7(8)-carboxy-4-phenyl-4-(parapyridyl)-3-oxatricyclo[4.2.1.0$^{2,5}$]nonane, and the like.

It will be readily appreciated that a wide variety of isomeric oxetanes are encompassed by the instant invention. For example, when $R_1$ and $R_2$ are different, two geometric isomers can be obtained for the same product:

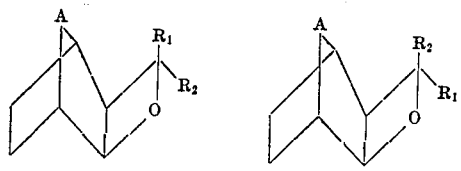

This is, of course, in addition to the usual isomeric forms possible when the $R_1$ and/or $R_2$ groups are themselves heterocyclic and can be attached to the oxetane ring in more than one position. Similarly, when the $R_5$ and $R_6$ of the general formula are other than hydrogen, isomeric products will also be obtained.

The novel oxetanes of this invention can be produced by the photocatalyzed reaction of a ketone with an olefinic compound, e.g., bicyclo-2,2,1-heptene-2, hereinafter referred to as norbornene, or various substituted norbornene.

The reaction producing the novel oxetanes of this invention is carried out by bringing the ketone and the olefinic compound into admixture in a suitable reactor and irradiating the mixture with light energy of a catalytic wavelength, typically in the range of from about 2,000 to about 4,000 Angstroms. The use of light energy of shorter wavelengths substantially below 2,000 Angstroms may engender the photolytic decomposition of the reactants and/or the oxetane product and is therefore to be avoided, while little if any of the desired reaction occurs using light energy of longer wavelengths substantially above 4,000 Angstroms. Thus, the term "light energy," as employed herein, contemplates wavelengths predominantly in the ultraviolet spectrum. Convenient sources of such light energy include, for instance, tungsten bulbs, daylight, mercury vapor and xenon arc lamps, etc.

The reaction of the ketone with the olefinic compound can be carried out in solution using an inert, normally liquid solvent such as a saturated aliphatic or aromatic hydrocarbon or halogen derivative thereof, as for instance, heptane, hexane, pentane, benzene, acetic acid, acetonitrile, carbon tetrachloride, and the like, especially those having a boiling point below about 100° C. The use of such a solvent is preferred. The reaction can, however, also be carried out "-nest," i.e., in the absence of external solvent.

The proportion in which the reactants are utilized can vary broadly, and does not limit the invention. Typically, the reactants are employed in a proportion of from about 0.1 mole to about 10 moles of the ketone per mole of the olefinic compound. Higher or lower proportions of reactants can also be employed satisfactorily. However, the efficient utilization of the reactants will generally decrease when greater than stoichiometric, i.e., equimolar, proportions are employed.

The reaction temperature can also vary broadly, typically in the range of from about 0° C. to about 100° C., and preferably in the range of from about 10° C. to about 30° C. Here again, higher or lower reaction temperatures may also be employed satisfactorily. In any given instance, however, the temperature should not be so high as to engineer the decomposition of the relatively heat-sensitive oxetane product, and is dependent to a large extent upon the identity of any external solvent employed. Thus, the temperature should not be so high as to volatilize the solvent, nor so low as to preclude its normally liquid form. Preferably, the temperature should also be consistent with the dissolution of any gaseous reactant in the solvent, i.e., should not volatilize the reactant from the solvent.

When within the above temperature range, the reaction is generally carried out, i.e., irradiation continued, for a period of from several hours to several days depending upon the concentration of reactants present, the wavelength and intensity of the light energy employed, etc. Longer or shorter reaction periods sufficient to produce the desired oxetane can also be utilized. Preferably, a stoichiometric amount or excess of the olefinic compound is admixed with the ketone and the reaction is carried out to completion as determined by periodically removing aliquots from the reaction mixture and subjecting the aliquots to infrared analysis. Under such circumstances the completion of the reaction is indicated by the disappearance of the carbonyl peak in the infrared spectrum, carbonyl absorption occurring at a wavelength of approximately 6 microns.

Any suitable vessel which will permit the transmission of light energy of the desired wavelength, as described above, can be employed as a reactor. Typically, Pyrex or quartz vessels are employed in this regard, Pyrex being preferred interposed between the reaction mixture and the source of light energy.

Upon completion of the reaction, the oxetane product, which is believed to have an exo configuration, and is ordinarily a colorless solid and crystalline in form, can be recovered in any convenient manner. For instance, the product can be recovered as the residue obtained upon the evaporation or distillation of any unreacted material and/or solvent present. The product can thereafter be purified, if desired, by extraction or recrystallization, etc.

The apparatus employed in the preparation of the oxetanes consisted of a quartz well (Hanovia No. 19434) with a Pyrex filter immersed in a Pyrex reaction vessel having a capacity of 200 milliliters. The reaction vessel was equipped at the bottom with a glass-fitted gas inlet for the introduction of purge gas and gaseous reaction, and the top with two outlets, one protected by a mercury bubbler and the other covered by a rubber septum through which periodic withdrawal of aliquots of the reaction mixture could be made. The light source was a 450 watt (Hanovia No. 679A–36) mercury arc lamp. The apparatus was maintained at a temperature in the range of 5–10° C. by immersing it in a refrigerated bath and circulating cooling water through the well.

Unless otherwise indicated, all of the oxetane products described herein were prepared by essentially the same procedure using the appropriate ketone and olefinic compound as reactants, as indicated in table A below. In each instance, the oxetane structure of the product was confirmed by infrared analysis, oxetane absorption occuring at a wavelength of 10±0.3 microns, and nuclear magnetic resonance.

EXPERIMENTAL PROCEDURE

A solution of 9.16 grams (0.05 mole) of metabenzoylpyridine and 4.76 grams (0.05 mole) of norbornene in 200 milliliters of benzene was introduced into the reaction vessel and the vessel was purged with nitrogen. The light source irradiating the reaction mixture was turned on for a period of 24 hours. At the conclusion of this period, the benzene solvent was removed by evaporation under reduced pressure leaving an oily residue which was allowed to harden. The residue was extracted with n-hexane on a Soxhlet extractor until all soluble material was removed. Evaporation of the extract, followed by recrystallization from diethyl ether, yielded essentially pure 4-(metapyridyl)-4-phenyl-3-oxatricyclo[4.2.1.0$^{2,5}$]nonane, the composition of example 8 in table A. In a similar manner, the carbonyl compounds and olefins set forth in table A were reacted to give the indicated oxetanes.

Certain of the novel oxetanes set forth in table A were not prepared directly the the photocycloaddition of a carbonyl compound with an olefin, but rather are derivatives of other oxetanes prepared by such method. For example, the novel oxetane of example 10 was synthesized by the methyl bromination of 4-(parapyridyl)-4-phenyl-3-oxatricyclo[4.2.1.0$^{2,5}$]nonane, the composition of example 9. This was effected by bubbling methyl bromide through a methanol solution of the oxetane at room temperature. After stripping off the methanol, the product was crystallized from acetone. The oxetanes of examples 11 and 12 were then prepared by reduction of the oxetane of example 10. The 4-(N-methyl-4-pyridyl)-4-phenyl-3-oxatricyclo[4.2.1.0$^{2,5}$]nonyl bromide of example 10 was reduced to 4-(N-methyl-4-piperideyl)-4-phenyl-3-oxatricyclo[4.2.1.0$^{2,5}$]nonane with sodium borohydride. Thereafter, the 4-(N-methyl-4-piperideyl)-4-phenyl-3-oxatricyclo[4.2.1.0$^{2,5}$]nonane was reduced in the presence of hydrogen and Adams catalyst (platinum oxide) to 4-(N-methyl-4-piperidyl)-4-phenyl-3-oxatricyclo[4.2.1.0$^{2,5}$]nonane.

The oxetanes of examples 16, 17, 23, 24 and 25 were prepared by the reaction of 4-chloromethyl-4-phenyl-3-oxatricyclo[4.2.1.0$^{2,5}$]nonane, the product of example 18, with piperidine, morpholine, N-methylpiperazine, and ethyl-N-piperazinocarboxylate respectively. The reactions were effected at reflux temperatures and the oxetanes recovered by conventional techniques.

In those instances wherein the reaction of the carbonyl compounds and olefins resulted in a mixture of isomeric products, separation was effected according to known techniques to provide the pure isomers.

TABLE A

| Ex. | Carbonyl compound | Olefin | Oxetane | Yield in percent | Calculated C | Calculated H | Calculated N | Calculated Cl | Found C | Found H | Found N | Found Cl |
|---|---|---|---|---|---|---|---|---|---|---|---|---|
| 1 | 1,1-bis(4-pyridyl)-ketone. | Norbornene | (4-$C_5H_4N$)$_2$- substituted oxetane-norbornane | ~50 | 77.66 | 6.51 | | | 77.50 | 6.53 | | |
| 2 | 4-acetylpyridine | do | 4-$C_5H_4N$-, $CH_3$- substituted oxetane-norbornane | 37 | 78.10 | 7.96 | | | 78.38 | 8.07 | | |
| 3 | 4-chloroacetophenone | do | (4-Cl)$C_6H_4$-, $CH_3$- substituted oxetane-norbornane | | 72.42 | 6.89 | | | 72.35 | 6.83 | | |
| 4 | 1,1-bis(3-pyridyl)-ketone. | do | (3-$C_5H_4N$)$_2$- substituted oxetane-norbornane | ~50 | 77.66 | 6.51 | | | 77.41 | 6.55 | | |
| 5 | 3-trifluoromethyl-acetophenone | do | $CH_3$-, (3-$CF_3$)$C_6H_4$- substituted oxetane-norbornane | 46 | 68.07 | 6.07 | | | 69.25 | 5.93 | | |
| 6 | 4-trifluoromethyl-acetophenone. | do | $CH_3$-, (4-$CF_3$)$C_6H_4$- substituted oxetane-norbornane | 45 | 68.07 | 6.07 | | | 67.99 | 6.07 | | |
| 7 | 2-benzoylpyridine | do | $C_6H_5$-, 2-$C_5H_4N$- substituted oxetane-norbornane | 38 | 82.28 | 6.91 | | | 82.28 | 6.77 | | |
| 8 | 3-benzoylpyridine | do | $C_6H_5$-, 3-$C_5H_4N$- substituted oxetane-norbornane | 53 | 82.28 | 6.91 | | | 82.46 | 6.98 | | |
| 9 | 4-benzoylpyridine | do | $C_6H_5$-, 4-$C_5H_4N$- substituted oxetane-norbornane | 67 | 82.28 | 6.91 | | | 82.28 | 6.81 | | |
| 10 | (Prepared from oxetane of Example 9) | | $C_6H_5$-, (4-$CH_3$)$C_5H_4N^+Br^-$- substituted oxetane-norbornane | | | | | | | | | |
| 11 | (Prepared from oxetane of Example 10) | | $C_6H_5$-, (4-$CH_3$)-$C_5H_7N$- substituted oxetane-norbornane | 98 | 81.31 | 8.53 | 4.74 | | 81.14 | 8.68 | 5.07 | |
| 12 | (Prepared from oxetane of Example 11) | | $C_6H_5$-, (4-$CH_3$)-$C_5H_9N$- substituted oxetane-norbornane | 74 | 80.75 | 9.15 | | | 80.87 | 9.19 | | |

TABLE A

| Ex. | Carbonyl compound | Olefin | Oxetane | Yield in percent | Calculated C | Calculated H | Calculated N | Calculated Cl | Found C | Found H | Found N | Found Cl |
|---|---|---|---|---|---|---|---|---|---|---|---|---|
| 13 | 1-(4-pyridyl)-1-(para-biphenyl)-ketone. | Norbornene | (structure: C$_{12}$H$_9$, 4—C$_5$H$_4$N) | | | | | | | | | |
| 14 | 4-benzoylpyridine | 5-carboxy-norborn-2-ene. | (structure: C$_6$H$_5$, 4—C$_5$H$_4$N, COOH) | ≮45 | 74.74 | 5.95 | | | 74.19 | 5.95 | | |
| 15 | 4-benzoylpyridine | 4-chloro-norborn-2-ene. | (structure: Cl, C$_6$H$_5$, 4—C$_5$H$_4$N) | | 73.18 | 5.81 | | | 73.17 | 5.88 | | |
| 16 | (Prepared from oxetane of Example 18) | | (structure: C$_6$H$_5$, CH$_2$—C$_5$H$_{10}$N) | 32 | 80.75 | 9.15 | | | 80.46 | 9.14 | | |
| 17 | (Prepared from oxetane of Example 18) | | (structure: C$_6$H$_5$, CH$_2$—C$_4$H$_8$NO) | 63.5 | 76.21 | 8.41 | | | 76.31 | 8.64 | | |
| 18 | 1-phenyl-1-chloromethyl ketone. | Norbornene | (structure: C$_6$H$_5$, CH$_2$Cl) | 76 | 72.42 | 6.89 | | 14.25 | 72.61 | 6.99 | | 14.4 |
| 19 | 1-(4-chlorophenyl)-1-(4-pyridyl)-ketone. | ...do... | (structure: (4-Cl)C$_6$H$_5$, 4—C$_5$H$_4$N) | 87 | 73.18 | 5.81 | | | 73.18 | 5.86 | | |
| 20 | 1,1-bis(4-pyridyl)-ketone. | 2,5-norbornadiene. | (structure: C$_6$H$_5$, 4—C$_5$H$_4$N, C$_6$H$_5$, 4—C$_5$H$_4$N) | | 82.87 | 6.22 | | | 82.53 | 6.31 | | |
| 21 | Benzophenone | 5-carboxy-norbene-2-ene | (structure: (C$_6$H$_5$)$_2$, COOH) | | 78.72 | 6.29 | | | 78.53 | 6.23 | | |
| 22 | 1-phenyl-1-(para-methoxyphenyl)-ketone. | 5-carboxy-norborn-2-ene. | (structure: C$_6$H$_5$, (4-CH$_3$O—)C$_6$H$_4$, COOH) | | 79.01 | 6.63 | | | 79.27 | 6.73 | | |
| 23 | (Prepared from oxetane of Example 18) | | (structure: C$_6$H$_5$, CH$_2$NC$_5$H$_5$) | 70 | 81.35 | 8.55 | 4.74 | | 81.35 | 8.80 | 5.08 | |

TABLE A

| Ex. | Carbonyl compound | Olefin | Oxetane | Yield in percent | Elemental analysis in percent |||||||| 
| | | | | | Calculated |||| Found ||||
| | | | | | C | H | N | Cl | C | H | N | Cl |
| 24 | (Prepared from oxetane of Example 18) | | structure with C₆H₅, CH₂NC₄H₈NCH₃ | 60 | 76.87 | 9.03 | 8.96 | | 76.58 | 9.23 | 9.46 | |
| 25 | (Prepared from oxetane of Example 18) | | structure with C₆H₅, CH₂NC₄H₈NCO₂C₂H₅ | 68 | 71.31 | 8.16 | 7.56 | | 71.78 | 8.21 | 7.16 | |
| 26 | Dibenzsuberone | Norbornene | structure | 15.3 | 87.37 | 7.33 | | | 86.43 | 7.37 | | |
| 27 | do | 5-carboxy-norborn-2-ene | structure with COOH | 19.4 | 79.74 | 6.40 | | | 79.52 | 6.49 | | |
| 28 | do | 5-hydroxymethyl-norborn-2-ene | structure with CH₂OH | 18.8 | 87.30 | 7.65 | | | 87.21 | 7.49 | | |
| 29 | Phenylglyoxylamide | Norbornene | structure with C₆H₅, CONH₂ | 86.5 | 74.05 | 7.04 | 5.76 | | 74.06 | 7.16 | 6.09 | |
| 30 | 2-chloro-thioxan-throne-10,10-dioxide | do | structure with Cl, SO₂ | | | | | | | | | |

The novel oxetanes of this invention may be employed in a variety of commercial applications, salient among which is their use as mildewcides. Found to be particularly useful in this regard are the metapyridyl substituted oxetanes. The metapyridyl substituted oxetanes generally demonstrate a high degree of mildewcidal effectiveness at lower concentrations, or when employed at equal strength demonstrate superior mildewcidal effectiveness, as compared with the other oxetanes contemplated by this invention.

It has also been found that the novel oxetanes of this invention are especially effective against *Erysiphe polygoni*, the casual organism of powdery mildew of bean and *Podosphaera leucotricha*, the causal organism of powdery mildew of apples.

Significantly, when applied to a mildew-susceptible host in a suitable inert carrier, the oxetanes, and particularly the metapyridyl-substituted oxetanes, demonstrate mildewcidal activity at concentrations as low as 0.1 part per million parts of carrier, or even at somewhat lower concentrations. Moreover, the oxetanes demonstrate good retention of mildewcidal activity for appreciable periods of time following their formation.

Typically, the oxetanes are employed as mildewcides in a concentration in the range of from about 4 to about 500 parts per million parts of carrier, although higher or lower mildewcidally effective amounts can also be employed. A preferred range is from about 20 to about 100 parts per million parts of carrier. Any suitable inert liquid or solid carrier such as water, talc, or the like, can be employed in this regard, as can readily be determined by one skilled in the art in the light of this disclosure.

The procedure employed in evaluating the novel oxetanes of this invention is as follows:

Biological Test Procedures

A stock suspension of the oxetane was prepared by dissolving 1 gram in 50 milliliters of acetone in which had been dissolved 0.1 gram of octylphenoxy polyethoxyethanol as an emulsifying agent. The resulting solution was mixed into 150 milliliters of water to give 200 milliliters of a suspension containing the oxetane in finely divided form. The various test concentrations described in parts per million were prepared by dilution of this stock solution.

Tender green beans were used as the host plant for the bean mildew, *Erysiphe polygoni*. A culture of this organism was maintained on bean plants in a greenhouse. Twenty-four hours prior to testing, uninfected plants with primary leaves fully expanded were inoculated by brushing their leaves lightly with plants taken from the stock culture.

The bean plants infected with mildew were sprayed on a revolving turntable for 30 seconds at a pressure of 40 p.s.i.g. Approximately 100 milliliters of spray were delivered. For control purpose, an equal volume of a water solution containing acetone emulsifier, and a conventional mildewcide, Karathane[1] in the same concentrations as the stock suspension above was also sprayed on other infected plants.

[1] 2,4-dinitro-6-(2-octyl)phenyl crotonate.

After the spray had dried, the plants were held in a greenhouse for a period of 7–10 days. At the end of this period, visual observations of mildew control were made according to the following designations:

5=100 percent control, no spots per leaf
4=1–3 spots per leaf
3=4–10 spots per leaf
2=Many but distinctly different spots
1=Leaf overrun with mildew; equal to check plants.

In a similar procedure, MacIntosh apple seedlings were used as the host plant for the apple mildew, *Podesphaera leucotricha*. The seedlings were inoculated 24 hours prior to initial spraying with a stock solution prepared as described above. Spraying was carried out as described above at weekly intervals for a period of 3 weeks. Visual observations of mildew control were made 1 week following each application in accordance with the designations set forth above. The treated plants were placed among untreated, heavily mildewed apple seedings during the entire test period except for the time required for spraying.

The results obtained using the oxetane product of example 8, viz 4-(metapyridyl)-4-phenyl-3-oxatricyclo[4.2.1.0$^{2,5}$]nonane, as the mildewcide are tabulated below in tables B and C. Table B is concerned with the use of the oxetane as a bean mildew eradicant while table C is concerned with the use of the oxetane as an apple mildew eradicant. The effectiveness rating is that made in accordance with the visual observations described above. The concentrations are in parts of mildewcide per million parts of carrier.

TABLE B

| Mildewcide | Concentration (p.p.m.) | Effectiveness rating | | |
|---|---|---|---|---|
| | | Test 1 | Test 2 | Test 3 |
| Oxatane of Example 8 | 20 | 5 | 5 | 5 |
| | 4 | 5 | 5 | 5 |
| | 0.8 | 5 | 4 | 4 |
| | 0.4 | 4 | | |
| Karathane | 20 | 5 | 5 | 5 |
| | 4 | 2 | 2 | 2 |
| | 0.8 | 1 | 1 | 1 |
| | 0.4 | 1 | | |

TABLE C

| Mildewcide | Concentration (p.p.m.) | Effectiveness rating | | | | | |
|---|---|---|---|---|---|---|---|
| | | First week | | Second week | | Third week | |
| | | Test 1 | Test 2 | Test 1 | Test 2 | Test 1 | Test 2 |
| Oxetane of Example 8 | 500 | 5 | 5 | 5 | 5 | 5 | 5 |
| | 100 | 5 | 5 | 5 | 5 | 5 | 5 |
| | 20 | 5 | 5 | 4 | 5 | 5 | 5 |
| | 4 | 3 | 5 | 2 | 4 | 4 | 4 |
| Karathane | 500 | 5 | 5 | 2 | 3 | 2 | 3 |
| | 100 | 5 | 5 | 5 | 5 | 5 | 5 |
| | 20 | 5 | 5 | 4 | 5 | 4 | 5 |
| | 4 | 3 | 5 | 3 | 3 | 3 | 3 |
| | | 2 | 4 | 2 | 2 | 1 | 2 |

The foregoing results clearly demonstrate the superior effectiveness of the oxetane as compared with the use of the conventional mildewcide. Control of the bean mildew was also demonstrated in similar manner using the oxetanes of examples 7, 9, and 10.

The effective dose required for a "3" rating in the control of bean mildew was obtained for each of these oxetanes by plotting log concentration of oxetane versus probit rating and deriving the concentration of oxetane in parts per million parts of water required for 50 percent control of mildew. Thus derived, the $ED_3$ values were found to be as follows:

| Mildewcide | $ED_3$ |
|---|---|
| Oxetane of ex. 8 | 0.8 |
| Oxetane of ex. 7 | 100 |
| Oxetane of ex. 9 | 40 |
| Oxetane of ex. 10 | 100 |

In addition to contacting the causative organism, mildew control is also realized by the application of the oxetanes of this invention in similar manner to an uninfected mildew susceptible host. Protection against the onset of mildew is thereby realized for appreciable periods of time during which the oxetanes are active as mildewcides.

Moreover, it has been found from screening tests that the oxetanes of this invention, particularly the metapyridyl-substituted oxetanes, are effective in other fungicidal applications. By way of illustration, the oxetane of example 8 has also demonstrated activity as a soil fungicide, *Pythium sp.* being the causative organism in this instance.

It has also been observed that the oxetanes of this invention are useful in the control of two foliar diseases, tomato early blight (*Alternaria solani*) and cucumber anthracnose (*Colletotrichum lagenarium*). The composition of example 8 was tested for these diseases in the following manner.

The causal organism of tomato early blight is cultured on potato dextrose agar at a temperature of 20° C. Transfers are made to Petri dishes 8 days prior to testing and scraped and irradiated with ultraviolet for 1 minute 1 day prior to testing.

One tomato plant variety Bonny Best of a standard age and height is sprayed on a revolving turntable. A 100–110 ml. volume of the formulated water mixture of chemical is applied to each plant with a DeVilbiss spray gun, air pressure set at 40 pounds. Application of the volume of spray takes 25 seconds. Similar applications to other plants are made with a water solution containing acetone and emulsifier in the same concentration as the test mixture but without the candidate pesticide. These plants are untreated checks or controls for the experiment. As soon as the spray had dried, the plants are inoculated by again placing them on the turntable and spraying with a spore suspension of early blight (containing 12,000-15,000 spores per ml. of water) for 30 seconds at 20 pounds pressure.

The test compound was formulated by a standard procedure of solution in acetone, addition of an emulsifier, and dilution with water.

Following inoculation the plants are incubated for 24 hours at 70° F. and 100 percent relative humidity. The plants are then removed from the incubation chamber and held for an additional 24 hours at room temperature.

The degree of infection is visually rated according to the following designations:

5 = no lesions (perfect control)
4 = very few lesions
3 = moderately infected
1 = many lesions, equal to untreated control plants The results obtained using the oxetane product of example 8 and a known fungicide are tabulated in table D below:

TABLE D

| Compound | Concentration (p.p.m.) | Effectiveness Rating |
|---|---|---|
| Oxetane of example 8 | 500 | 4 |
| | 100 | 2 |
| | 20 | 1 |
| | 4 | |
| Zinc ethylene bisdithiocarbamate | 500 | |
| | 100 | 5 |
| | 20 | 4 |
| | 4 | 2 |

The causal organism of cucumber anthracnose is cultured on freshly prepared lima bean agar. One week following inoculation, pink spore masses are formed. An aqueous suspension containing 200,000-500,000 spores per ml. is prepared as inoculum. The plants are grown in 3-inch pots. Two plants per pot are sprayed on a revolving turntable. A 100-110 ml. volume of the formulated water mixture of the chemical is applied to the plants with a DeVilbiss spray gun with air pressure set at 40 pounds p.s.i. Application of this volume of spray takes 25 seconds. An equal volume of a water solution containing acetone and emulsifier in the same concentrations as the fungicidal mixture but without the candidate fungicide is also sprayed on 4 cucumber plants which are held as untreated checks or controls. As soon as the spray has dried, the plants are inoculated by again placing them on the turntable and spraying with the spore suspension of anthracnose for 30 seconds at 20 pounds p.s.i.

The test compounds are formulated by a standard procedure of solution in acetone, addition of an emulsifier, and dilution with water.

Following inoculation the plants are incubated for 24 hours at 70° F. and 100 percent relative humidity. The plants are then removed from the incubation chamber and held at 80° F. and 50 percent relative humidity until symptoms of disease develop.

One week after inoculation counts are made of the total number of lesions found on the primary leaves of each plant, treated and untreated. The percent control is calculated, and results are reported according to the following designations:

5 = 90-100 percent control
4 = 70-89 percent control
3 = 50-69 percent control
2 = 25-49 percent control
1 = 0-24 percent control The results obtained using the oxetane product of example 8 and a known fungicide are tabulated in table E below:

TABLE E

| Compound | Concentration (p.p.m.) | Effectiveness Rating |
|---|---|---|
| Oxetane of example 8 | 500 | 4 |
| | 100 | 1 |
| | 20 | 1 |
| | 4 | 1 |
| Manganese bisdithiocarbamate | 500 | |
| | 100 | 5 |
| | 20 | 3 |
| | 4 | 2 |

In addition to their use as mildewcides, the novel oxetanes of this invention are useful in other areas of application. The oxetanes of this invention are also useful as organic intermediates for the preparation of a wide variety of compounds. For example, in the presence of acids, the novel oxetanes of this invention can be cleaved across the oxetane ring to form olefins. Moreover, these novel oxetanes, as are the known cyclic ethers, are useful as plasticizers. Additionally, the oxetanes can homopolymerize or copolymerize readily with other reactive cyclic monomers to provide a useful class of polymeric compounds. These polymers can range from various liquids to tough solids. The viscous liquids of relatively low molecular weight, are useful in the preparation of polishes and waxes and as thickening agents for various lubricants. The polymers can also be employed as protective coatings and are useful for the production of various shaped articles such as brush handles, buttons, and the like. Moreover, since many of the compositions of this invention contain desirable functional groups, they are particularly useful in those areas where it is desirable to build such groups into the polymeric network.

Illustrative cyclic monomers which can polymerize with the oxetanes of this invention include, among others, the epoxides, such as 4-vinylcyclohexene dioxide, 3,4-epoxycyclohexyl, 3,4-epoxycyclohexylcarboxylate, bis(2,3-epoxycyclopentyl)ether, and the like. Polymerization can be effected in the presence of known epoxide polymerization catalysts according to accepted techniques.

What is claimed is:

1. The method for the production of the oxetanes of the formula:

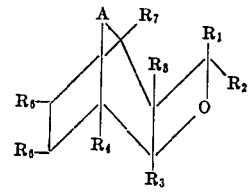

Wherein A represents methylene; $R_1$ and $R_2$ individually represent a member selected from the group consisting of lower alkyl, halo-lower alkyl, phenyl or pyridyl; and $R_3$-$R_8$ represent hydrogen; which comprises bringing norbornene into admixture with a ketone selected from the group consisting of 1,1-bis(4-pyridyl)ketone; 4-acetylpyridine; 4-chloroacetophenone; 1,1-bis(3-pyridyl)ketone; 3-trifluoromethylacetophenone; 4-trifluoromethylacetophenone; 2-benzoylpyridine; 3-benzoylpyridine; 4-benzoylpyridine; 1-phenyl-1-chloromethyl ketone; 1,1-bis(4-pyridyl)ketone; and, benzophenone and irradiating the resulting mixture with light energy at a wavelength in the range of from about 2,000 to about 4,000 Angstroms for a period of time to produce said oxetane.

2. The method for the production of the oxetane of the formula:

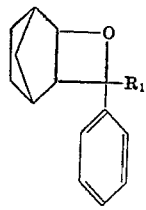

wherein $R_1$ is pyridyl which comprises bringing benzoylpyridine into admixture with norbornene and irradiating the resulting mixture with light energy at a wavelength in the range of from about 2,000 to about 4,000 Angstroms for a period of time sufficient to produce said oxetane.

3. The method for the production of 4-(metapyridyl)-4-phenyl-3-oxatricyclo[4.2.1.0$^{2,5}$]nonane which comprises bringing metabenzoylpyridine into admixture with norbornene and irradiating the resulting mixture with light energy at a wavelength in the range of from about 2,000 to about 4,000 Angstroms and at a temperature in the range of from about 0° C. to about 100° C. for a period of time sufficient to produce said 4-(metapyridyl)-4-phenyl-3-oxatricyclo[4.2.1.0$^{2,5}$]nonane.

4. The method according to claim 3 wherein the temperature is in the range of from about 10° to about 30° C.

5. A method for the production of 4-phenyl-4(N-methyl-1,2,5,6-tetrahydropyridyl)-3-oxatricyclo[4.2.1.0$^{2,5}$]nonane which comprises (1) bringing norbornene into admixture with benzoylpyridine, and irradiating the resulting mixture with light energy at a wavelength in the range of from about 2,000 to about 4,000 Angstroms and at a temperature in the range of from about 0° C. to about 100° C. for a period of time sufficient to produce 4-(parapyridyl)-4-phenyl-3-oxatricyclo[4.2.1.0$^{2,5}$]nonane, (2) methylating said 4-(parapyridyl)-4-phenyl-3-oxatricyclo[4.2.1.0$^{2,5}$]nonane to form 4-(N-methylpyridyl)-4-phenyl-3-oxatricyclo[4.2.1.0$^{2,5}$]nonane, and (3) reducing said 4-(N-methylpyridyl)-4-phenyl-3-oxatricyclo[4.2.1.0$^{2,5}$]nonane to 4-phenyl-4(N-methyl-1,2,5,6-tetrahydropyridyl)-3-oxatricyclo[4.2.1.0$^{2,5}$]nonane.

* * * * *